United States Patent
Wang et al.

(10) Patent No.: US 9,895,758 B2
(45) Date of Patent: Feb. 20, 2018

(54) RING TOOL UNIT, METHOD FOR MANUFACTURING THE SAME, SLEEVE, AND MANDREL

(71) Applicant: NAKATA MANUFACTURING CO., LTD., Osaka (JP)

(72) Inventors: Feizhou Wang, Osaka (JP); Takeyuki Sato, Osaka (JP); Mitsuru Nakata, Osaka (JP); Tomoyasu Nakano, Osaka (JP); Takamitsu Miura, Osaka (JP)

(73) Assignee: NAKATA MANUFACTURING CO., LTD., Osaka (JP)

( * ) Notice: Subject to any disclaimer, the term of this patent is extended or adjusted under 35 U.S.C. 154(b) by 0 days.

(21) Appl. No.: 15/126,185

(22) PCT Filed: Mar. 18, 2014

(86) PCT No.: PCT/JP2014/057384
§ 371 (c)(1),
(2) Date: Sep. 14, 2016

(87) PCT Pub. No.: WO2015/140932
PCT Pub. Date: Sep. 24, 2015

(65) Prior Publication Data
US 2017/0080507 A1    Mar. 23, 2017

(51) Int. Cl.
*B23K 37/08* (2006.01)
*B23K 101/06* (2006.01)
(Continued)

(52) U.S. Cl.
CPC ........ *B23D 79/023* (2013.01); *B21C 37/0811* (2013.01); *B23K 31/02* (2013.01);
(Continued)

(58) Field of Classification Search
CPC . B21C 37/0811; B23K 37/08; B23K 2201/06; B23D 79/023; Y10T 29/5182;
(Continued)

(56) References Cited

U.S. PATENT DOCUMENTS 2,076,062 A    4/1937    Berg et al.
3,165,028 A *    1/1965    Keska ................. B23D 79/023
                                                     29/33 A
(Continued)

FOREIGN PATENT DOCUMENTS

CN        101925437 A    12/2010
DE         3332336 A *    3/1985
(Continued)

OTHER PUBLICATIONS

Machine Translation of JP 02-131811-A, which JP '811 was published May 1990.*
(Continued)

Primary Examiner — Erica E Cadugan
(74) Attorney, Agent, or Firm — Ladas & Parry LLP (57) ABSTRACT

An object is to prolong the life of a ring tool, and improve the productivity of a welded pipe. A ring tool unit is held in a downstream-side end portion of a mandrel to be inserted into a welded pipe currently being manufactured from the upstream side of a welding position, and is used as a cutting tool for continuously cutting a bead produced on the inner surface of the welded pipe, wherein the ring tool unit is formed by fitting a ring tool having a ring-like blade in a sleeve having a circular hole for holding the outer circumference of the ring tool.

5 Claims, 7 Drawing Sheets

(51) Int. Cl.
| | |
|---|---|
| B21C 37/08 | (2006.01) |
| B23D 79/10 | (2006.01) |
| B23D 79/02 | (2006.01) |
| B23K 31/02 | (2006.01) |
| B23K 101/10 | (2006.01) |

(52) U.S. Cl.
CPC .......... B23K 37/08 (2013.01); *B23K 2201/06* (2013.01); *B23K 2201/10* (2013.01); *Y10T 29/5182* (2015.01); *Y10T 29/5185* (2015.01); *Y10T 29/5199* (2015.01); *Y10T 409/501804* (2015.01)

(58) Field of Classification Search
CPC ............. Y10T 29/5185; Y10T 29/5199; Y10T 409/501804
USPC ....... 29/33 A, 33 D, 33 T; 409/299; 228/160
See application file for complete search history.

(56) References Cited

U.S. PATENT DOCUMENTS

| | | | | |
|---|---|---|---|---|
| 3,395,614 | A | * | 8/1968 | Dodson ................ B23D 79/023 407/102 |
| 4,138,925 | A | * | 2/1979 | Schulte ................ B23D 79/023 409/299 |
| 4,600,180 | A | | 7/1986 | Abbey, III |
| 4,710,078 | A | | 12/1987 | Altmeyer et al. |
| 5,056,972 | A | * | 10/1991 | Burwell ................ B23D 79/023 407/114 |
| 7,325,471 | B2 | | 2/2008 | Massa et al. |
| 2006/0051167 | A1 | | 3/2006 | Massa et al. |
| 2016/0199994 | A1 | * | 7/2016 | Seminew ............ B23D 79/023 83/861 |

FOREIGN PATENT DOCUMENTS

| | | | | |
|---|---|---|---|---|
| DE | 102010013472 | A1 | * | 10/2011 |
| EP | 0 150 414 | A1 | | 8/1985 |
| JP | 60-155309 | A | * | 8/1985 |
| JP | 02-131811 | A | * | 5/1990 |
| JP | 11-151608 | A | | 6/1999 |
| JP | 2000-263128 | A | * | 9/2000 |
| JP | 2001-239402 | A | * | 9/2001 |
| RU | 2 100 169 | C1 | | 12/1997 |
| RU | 2007 112 938 | A | | 10/2008 |
| SU | 643276 | A1 | | 1/1979 |
| SU | 1540999 | A1 | | 2/1990 |

OTHER PUBLICATIONS

Chinese Office Action dated Jul. 17, 2017 in connection with Chinese Application No. 201480077154.9, with English translation.
Korean Office Action dated Jul. 18, 2017 in connection with Korean Application No. 10-2016-7023652, with English translation.
Espacenet English abstract of CN 101925437 A.
J-PlatPat English abstract of JP 11-151608 A.
International Search (ISR) and Written Opinion (WO) dated Apr. 22, 2014 for International Application No. PCT/JP2014/057384.
Extended European Search Report (ESR) dated Oct. 23, 2017 in connection with corresponding European Patent Application No. 14 88 6647.8.
Russian Office Action dated Dec. 1, 2017 in connection with Russian Application No. 2016140635 with English translation.
Espacenet English abstract of RU 2379159 C2 which corresponds to RU 2007 112 938 A.
English abstract of RU 2 100 169 C1.

* cited by examiner

RING TOOL UNIT, METHOD FOR MANUFACTURING THE SAME, SLEEVE, AND MANDREL

RELATED APPLICATION

This application is an application under 35 U.S.C. 371 of International Application No. PCT/JP2014/057384 filed on Mar. 18, 2014, the entire contents of which are incorporated herein by reference.

TECHNICAL FIELD

The present invention relates to a ring tool unit for smoothing the inner surface of a welded pipe.

BACKGROUND ART

In the abovementioned technical field, a tool fixation assisting tool having a large-area contact surface which comes in contact with an inclined surface of a ring-like tool is disclosed in each of patent literatures 1 and 2. The purpose of this assisting tool is to provide an inner surface bead cutting tool which enables the use of even an ordinary flat bolt regardless of the size of a ring-like tool, and can strongly fix the ring-like tool with a large contact area.

CITATION LIST

Patent Literature

Patent literature 1: Japanese Patent Laid-Open No. 2000-263128
Patent literature 2: Japanese Patent Laid-Open No. 2001-239402

SUMMARY OF THE INVENTION

Technical Problem

In each of the techniques described in the abovementioned literatures, however, a processing error or assembling error occurs, so the shape of the inner curved surface of a recess of the assisting tool does not completely match the outer circumferential surface of the ring tool, and this limits the contact with the ring tool. When cutting an inner surface bead, therefore, bending stress occurs in the ring tool, and this makes the ring tool easier to break than when the ring tool is directly fitted in a circular hole without using the assisting tool. When the life of the ring tool is thus short, the production cost of the welded pipe increases, so the technique of patent literature 1 is practically very difficult to use.

The present invention enables to provide a technique of solving the above-described problem.

Solution to Problem

One aspect of the present invention provides a ring tool unit that is held in a downstream-side end portion of a mandrel to be inserted into a welded pipe currently being manufactured from an upstream side of a welding position, and is used as a cutting tool for cutting a bead produced on an inner surface of the welded pipe,
wherein the ring tool unit is formed by fitting a ring tool having a ring-like blade in a sleeve having a circular hole for holding an outer circumference of the ring tool.

Another aspect of the present invention provides the ring tool unit wherein the ring tool is formed into a columnar shape having an inclined upper surface, and an upper surface of the sleeve is inclined more than the inclined upper surface of the ring tool.

Still another aspect of the present invention provides the ring tool unit wherein the sleeve is formed into a columnar shape having an inner diameter smaller than an outer diameter of the ring tool at room temperature, and the ring tool unit is formed by fitting the ring tool in the sleeve such that a compressive force is applied in a circumferential direction of the ring tool.

Still another aspect of the present invention provides the ring tool unit wherein the sleeve has a polygonal outer circumferential shape.

Still another aspect of the present invention provides a sleeve used in the abovementioned ring tool unit.

Still another aspect of the present invention provides a mandrel including the abovementioned ring tool unit.

Still another aspect of the present invention provides a method for manufacturing the abovementioned ring tool unit, characterized in that the ring tool is fixed to the sleeve by performing one of shrink-fit, cold-fit, and press-fit on the sleeve.

Advantageous Effects of Invention

The present invention can prolong the life of a ring tool, and improve the productivity of a welded pipe.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
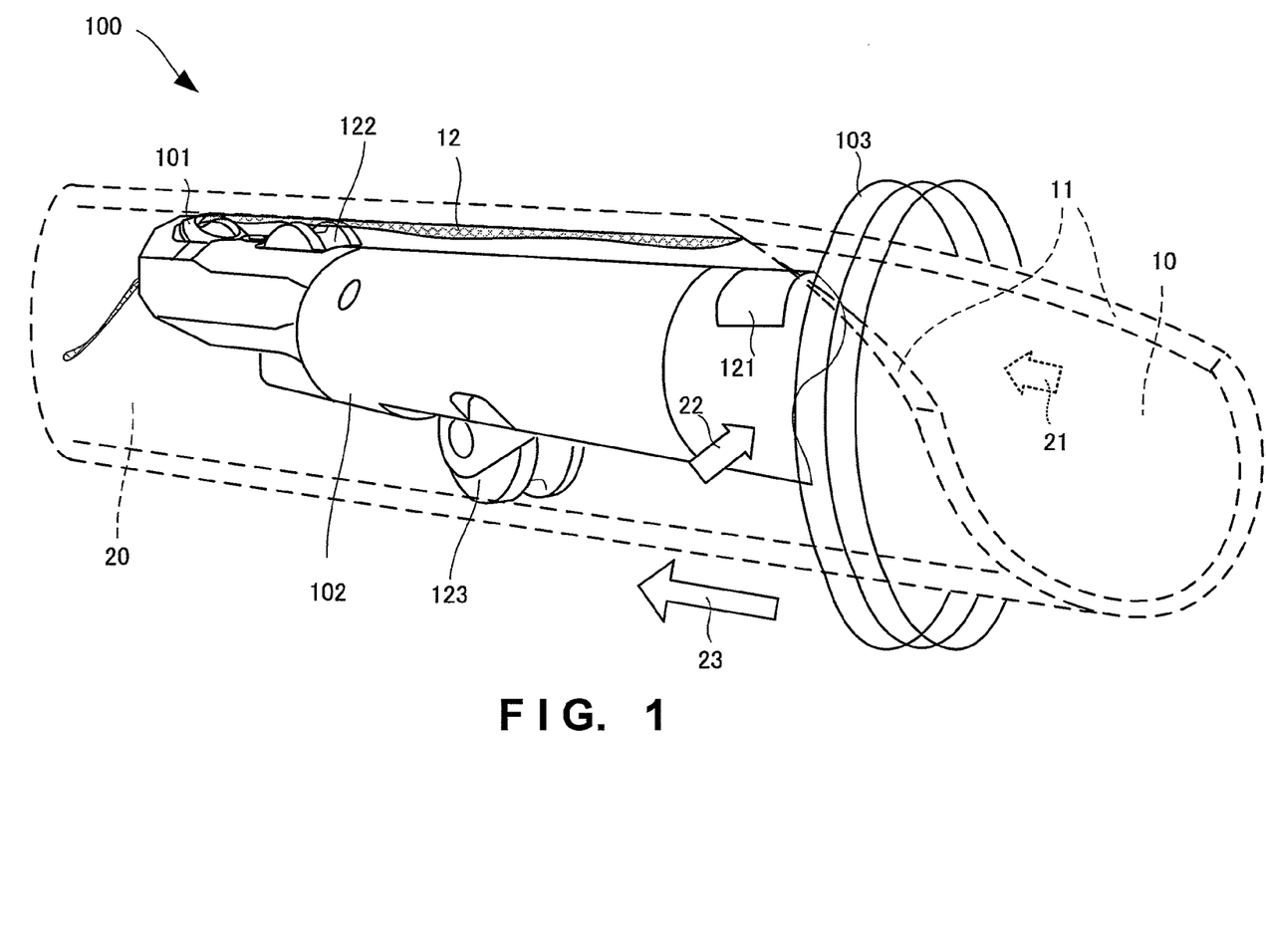
FIG. 1 is view showing the arrangement of a welded pipe manufacturing apparatus according to the first embodiment of the present invention.

A welded pipe manufacturing apparatus 100 using a ring tool unit 101 as the first embodiment of the present invention and placed in the periphery of an inner surface bead cutting portion will be explained with reference to FIG. 1. In the periphery of an inner surface bead cutting portion, the welded pipe manufacturing apparatus 100 includes the ring tool unit 101, a mandrel 102, and a work coil 103.

The welded pipe manufacturing apparatus 100 conveys a metal band in the direction of an arrow 23, while a bending processor (not shown) applies forces to the metal band in the directions of arrows 21 and 22, thereby molding the metal band into the shape of an open pipe 10.

Then, two widthwise-direction end portions 11 of the open pipe 10 are heated by inserting the open pipe 10 between the work coil 103 and an impeder 121, and fused by upset welding, thereby molding a welded pipe 20. Although this embodiment uses resistance welding by the work coil, another method may also be used.

In the manufacturing process of the welded pipe 20 as described above, a raised inner surface bead 12 is formed in the welded portion of the pipe inner surface. If the inner surface bead 12 is left unremoved, the surface dimensional accuracy and thickness accuracy matching the required specifications cannot be obtained.

Accordingly, bead cutting is performed using the ring tool unit 101, thereby smoothing the inner surface of the welded pipe 20. The ring tool unit 101 is held at the downstream-side distal end of the mandrel 102. The mandrel 102 is inserted into the welded pipe currently being manufactured, i.e., into the open pipe 10 from the upstream side of the welding position.

Rollers 122 and 123 are rotatably installed on the upper circumferential surface and lower circumferential surface of the mandrel 102, and hold the mandrel 102 at a predetermined position in the welded pipe 20. A groove for making the inner surface bead 12 pass is formed in the middle portion of the upper roller 122.

Since the roller 123 adjusts the height, the ring tool unit 101 cuts the inner surface bead 12 while being pressed against the inner surface of the welded pipe 20 with a predetermined pressure in a predetermined position.

Figure 2:
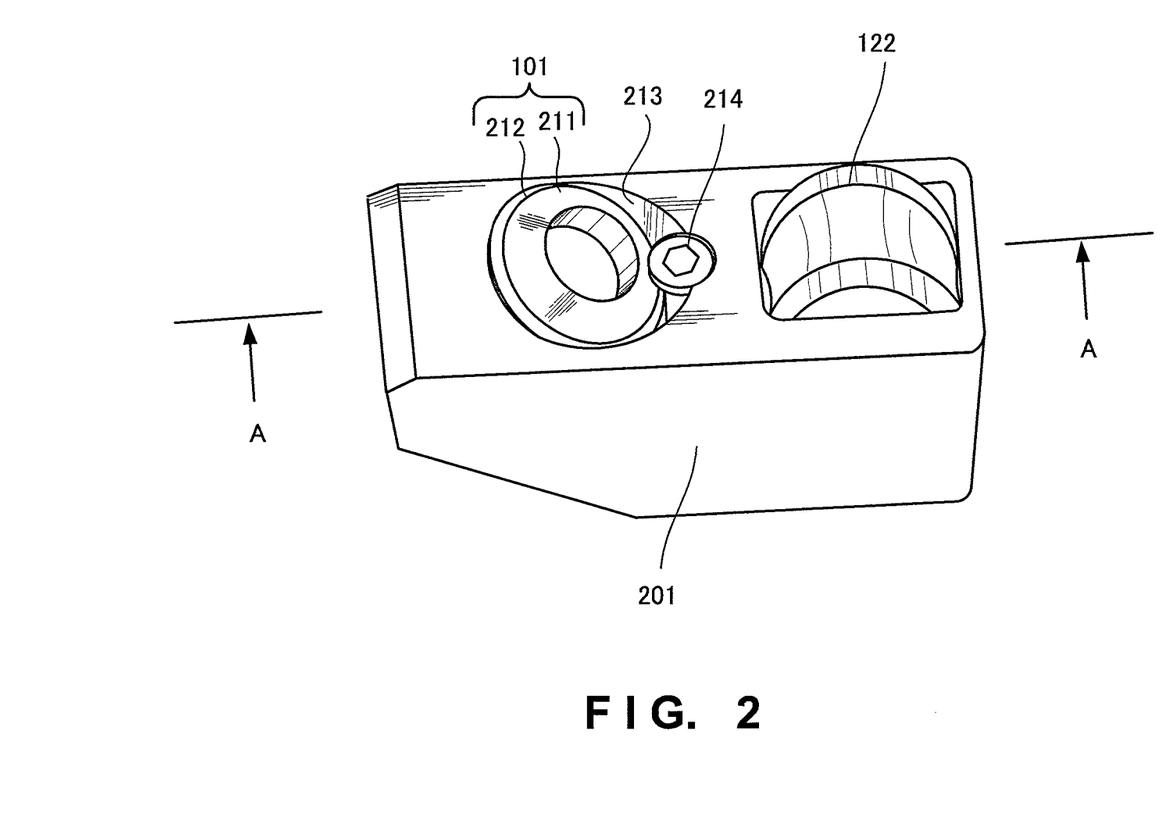
FIG. 2 is a perspective view showing the arrangement of a tool carriage according to the first embodiment of the present invention.

FIG. 2 is a schematic perspective view showing, from above, a tool carriage (tool holder) 201 to which the ring tool unit 101 is attached in the distal end portion of the mandrel 102.

The ring tool unit 101 has an arrangement in which a ring tool 211 is fitted inside a ring-like sleeve 212. The ring tool 211 is formed by powder metallurgy such as tungsten, and formed into a cylindrical shape having a ring-like blade on the inner circumference of an inclined upper surface.

The ring tool 211 is strong against compression but weak against bending. On the other hand, when the ring-like sleeve 212 holds the outer circumference of the ring tool 211, compressive stress can be applied in the circumferential direction of the ring tool 211 in advance. Even when tensile stress acts on the ring tool, therefore, the stress is largely relaxed, and this largely reduces breakage of the ring tool 211. This makes it possible to use the ring tool 211 itself for a long time period, and dramatically improve the productivity and yield of the welded pipe.

Also, even when the ring tool 211 partially chips or cracks, a complete breakage can be prevented because the sleeve 212 strongly holds the ring tool 211 to the vicinity of the blade surface. Furthermore, even if the ring tool 211 breaks, the sleeve cuts the bead for a short time. This can prevent the bead from colliding against the tool carriage 201, and can also contribute to prolonging the life of the tool carriage 201.

Figure 3:
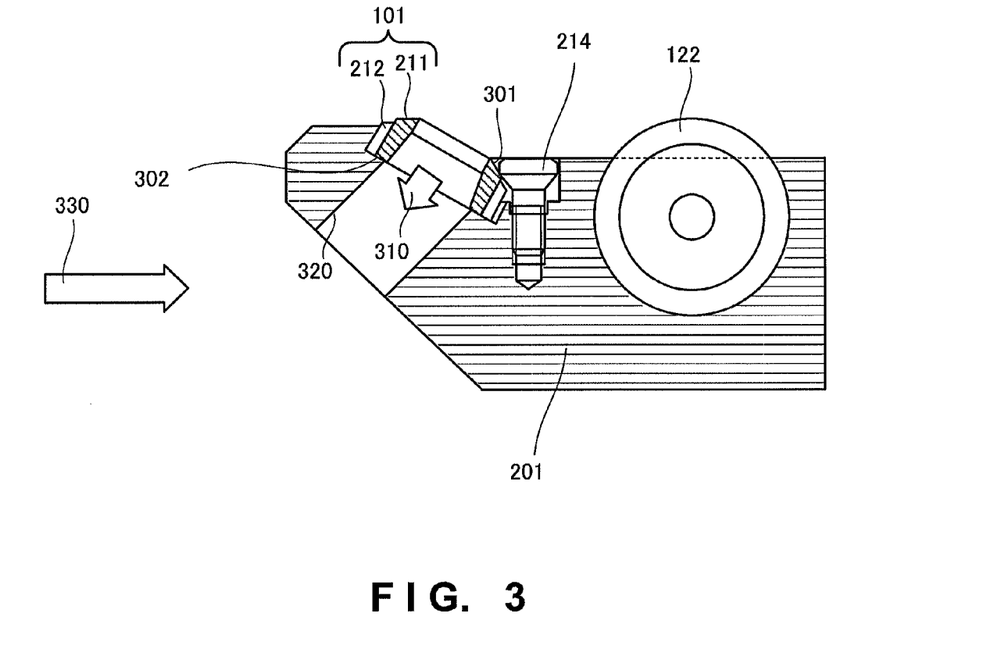
FIG. 3 is a sectional view showing the arrangement of the tool carriage according to the first embodiment of the present invention.

FIG. 3 is a schematic sectional view taken along a line A-A in FIG. 2. The ring tool unit 101 is fitted in a recess 213, and fixed by a bolt (screw) 214 so as not to come out. The head of the bolt 214 abuts against an inclined upper surface 301 of the ring tool 211, and pushes the ring tool unit 101 in the direction of an arrow 310. Consequently, the lower surface of the ring tool unit 101 is firmly pressed against a bottom surface 302 of the recess 213, and the position of the ring tool unit 101 stabilizes. The bead cut by the ring tool 211 is discharged through a circular hole 320 formed in the bottom surface 302 of the recess 213. Since the ring tool unit 101 is rotated in the recess 213, one ring tool unit 101 can be used in bead cutting for a long time. The timing at which the ring tool unit 101 is rotated is when the ring tool 211 has chipped or has been used for a predetermined time. When rotating the ring tool 211, the bolt 214 is loosened, and the ring tool 211 is rotated together with the ring tool unit 101 in the recess 213.

The upper surface of the sleeve 212 is inclined at almost the same angle as that of the inclined upper surface 301 of the ring tool 211, or inclined more than the inclined upper surface of the ring tool. Accordingly, the sleeve does not collide against the bead when the ring tool 211 is in a normal state. On the other hand, if the ring tool 211 has broken, the sleeve 212 alone can effectively cut the bead for a predetermined time.

Note that the head of the bolt 214 is in contact with the upper surface 301 of the ring tool 211 in FIG. 3, but the present invention is not limited to this. The head of the bolt 214 may also be abutted against the upper surface of the sleeve 212.

Figure 4:
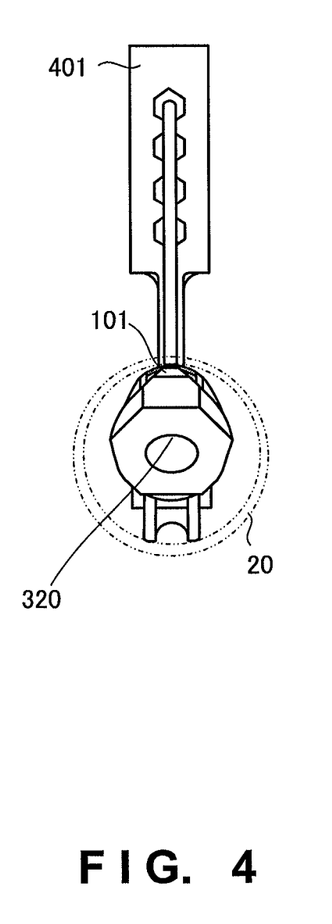
FIG. 4 is a side view showing the arrangement of the tool carriage according to the first embodiment of the present invention.

FIG. 4 is a side view showing the mandrel 102 in the direction of an arrow 330 in FIG. 3. The mandrel 102 is fixed by a support member 401. The inner surface bead cut by the ring tool is discharged into the welded pipe 20 directly from the circular hole 320 or after being cut short by a bead chopper (not shown).

Figure 5:
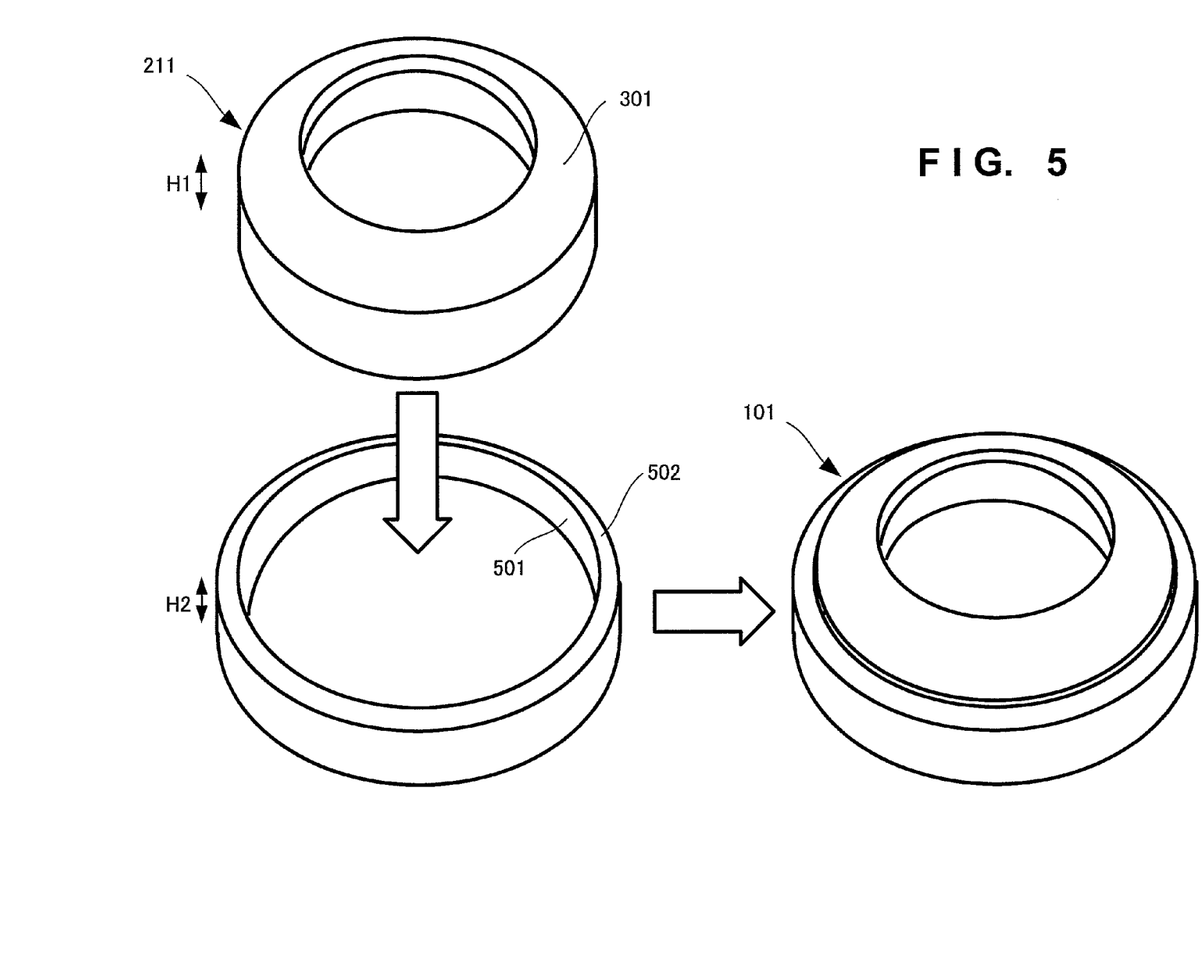
FIG. 5 is a view showing the arrangement of a ring tool unit according to the first embodiment of the present invention.

FIG. 5 is a view for explaining a method for manufacturing the ring tool unit 101.

The sleeve 212 has a circular hole 501 for holding the outer circumferential surface of the ring tool 211 by surface contact. The circular hole 501 has an inner diameter smaller than the outer diameter of the ring tool 211 at room temperature. The ring tool 211 is fitted (shrink-fitted) in the sleeve 212 expanded by heating, and naturally cooled, thereby fitting the sleeve so as to apply a compressive force in the circumferential direction of the ring tool, and forming the ring tool unit 101. However, the present invention is not limited to this manufacturing method, and it is also possible to use cold-fit or press-fit. The sleeve 212 is formed into a columnar shape having an inclined upper surface 502 by using a material having strength relatively higher than that of the inner surface bead having high toughness. The sleeve 212 is normally unscratched after the ring tool is used, and hence is repetitively usable by fitting another ring tool as long as the pressurization effect does not reduce.

The upper surface 502 of the sleeve 212 inclines at almost the same angle as that of the inclined upper surface 301 of the ring tool 211. Also, as shown in FIG. 3, a height H2 of the sleeve 212 is made smaller than a height H1 of the ring tool 211.

Generally, the bit of a ring tool is gradually worn away while cutting a bead, causes small cracking or chipping when the load increases, and breaks when kept used. The bit sometimes immediately breaks when cutting a large bead or a foreign body. Conventionally, when the bit of a ring tool is partially worn away, the ring tool is rotated and reused.

However, the ring tool cannot be reused by rotation if the ring tool breaks. In this embodiment, even when the ring tool breaks, the sleeve retains the shape of the ring tool, so the ring tool can be rotated and reused by using a normal bit. Also, in this embodiment, pressurization for compression can be applied to the ring tool. Therefore, even when a large load acts when the ring tool is in use and a tensile force is applied, the tensile force is canceled by the pressurization, so breakage hardly occurs in the first place. In addition, the sleeve itself can receive the bead for a short time. This makes it possible to prevent the bead from directly abutting against the tool carriage and damaging it.

That is, as described above, this embodiment can prolong the life of a ring tool, prevent breakage of a tool carriage, and improve the manufacturing efficiency of a welded pipe.

Second Embodiment

Figure 6:
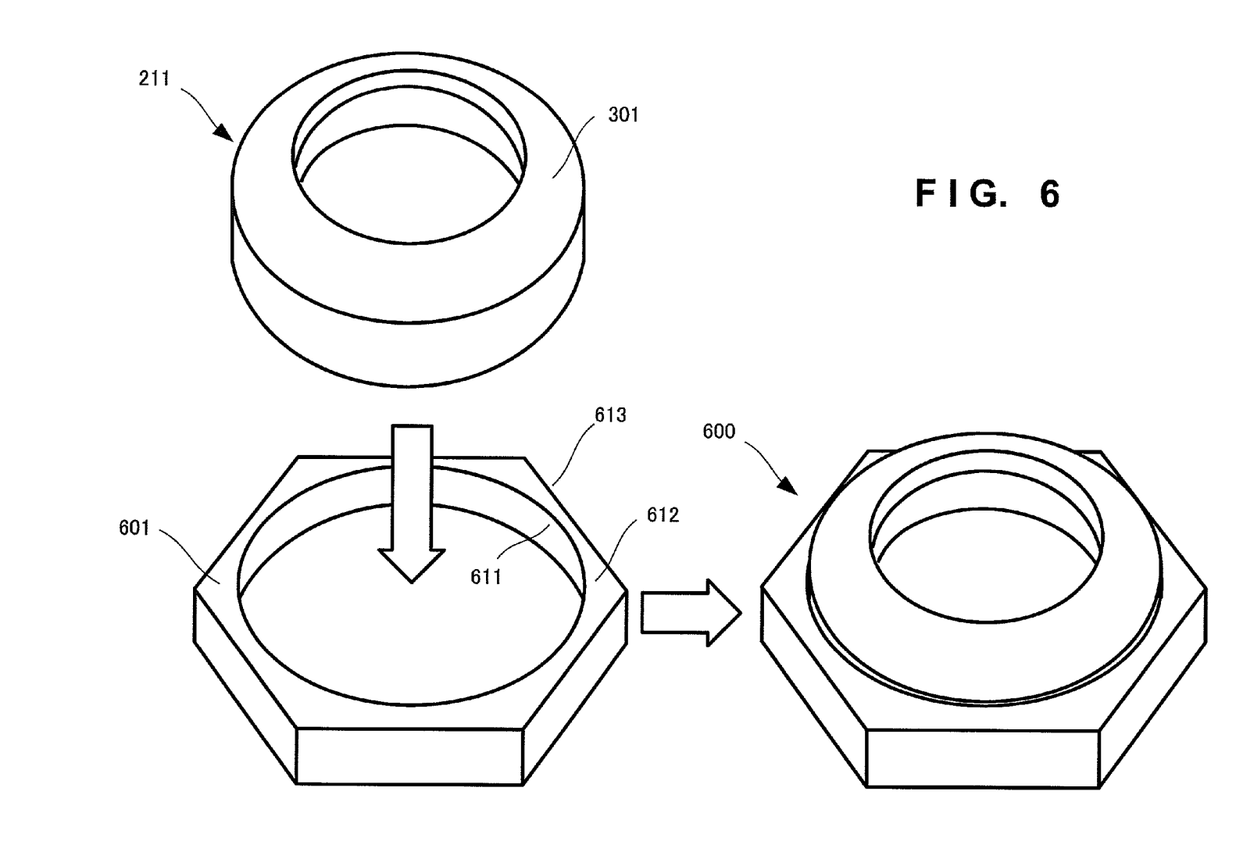
FIG. 6 is a view showing the arrangement of a ring tool unit according to the second embodiment of the present invention.
Figure 7:
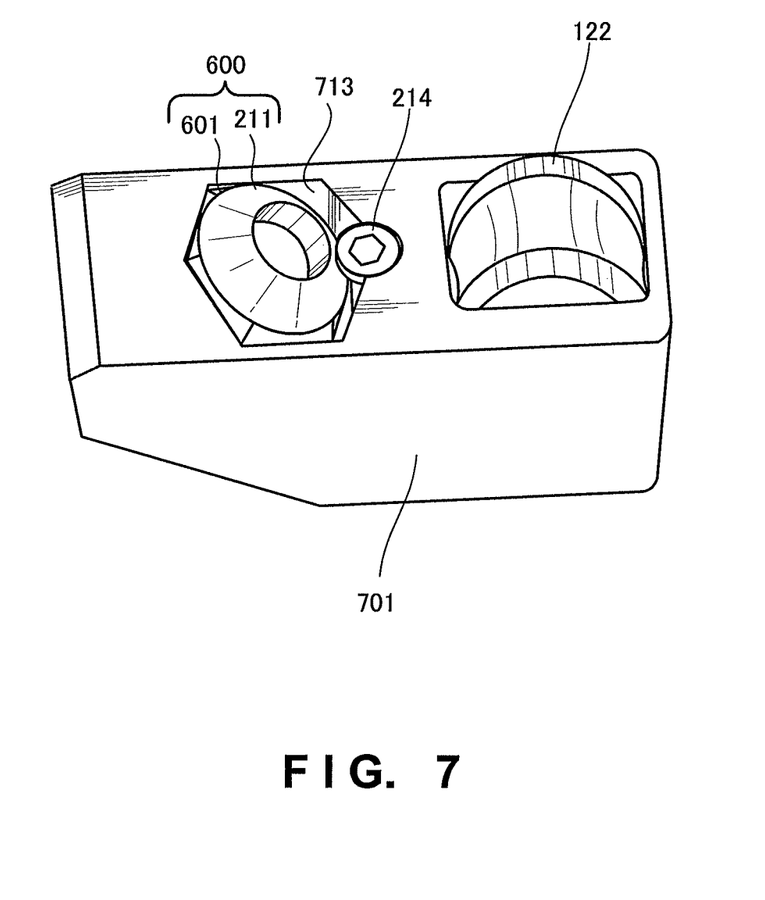
FIG. 7 is a perspective view showing the arrangement of a tool carriage according to the second embodiment of the present invention.

A ring tool unit 600 according to the second embodiment of the present invention will be explained below with reference to FIGS. 6 and 7. FIGS. 6 and 7 are views showing the ring tool unit 600 and a method for manufacturing the same according to this embodiment.

The ring tool unit 600 according to this embodiment differs from the abovementioned first embodiment in that a sleeve 601 has a hexagonal outer circumference 613. The rest of the arrangement and the operations are the same as those of the first embodiment, so the same reference numerals denote the same members and operations, and a detailed explanation thereof will be omitted.

The outer circumferential surface of the sleeve 601 has the shape of a regular hexagon when viewed from above. On the other hand, an inner circumferential surface 611 of the sleeve 601 is formed to have a shape and dimensions to be fitted on the outer circumferential surface of a ring tool 211, as in the first embodiment. Also, an upper surface 612 of the sleeve 601 inclines at the same angle as that of an upper surface 301 of the ring tool 211, as in the first embodiment.

As shown in FIG. 7, a tool carriage 701 according to this embodiment includes a tool unit mounting recess 713 having a regular hexagonal shape.

When changing a blade contact position by rotating the ring tool unit 600, the sleeve 601 according to this embodiment can change the position to six portions at equal intervals. That is, it is possible to accurately rotate the ring tool 211 at 60° at one time. This makes it possible to accurately perform ring tool rotation which is conventionally intuitively performed.

Note that the example in which the outer circumference of the sleeve has a hexagonal shape has been explained in this embodiment, but the present invention is not limited to this, and the outer circumferential shape may also be another polygon or an ellipse.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A ring tool unit that is held in a downstream-side end portion of a mandrel to be inserted, from an upstream side of a welding position, into a welded pipe currently being manufactured, and which ring tool unit is used as a cutting tool for cutting a bead produced on an inner surface of the welded pipe,
wherein the ring tool unit is formed by fitting a ring tool having a ring-like blade in a sleeve having a circular hole for holding an outer circumference of said ring tool, wherein said circular hole has an inner diameter that is smaller than an outer diameter of the outer circumference of the ring tool at room temperature.

2. The ring tool unit according to claim 1, wherein said ring tool is formed into a columnar shape having an inclined end surface that is inclined relative to a longitudinal central axis of the columnar shape, and wherein an end surface of said sleeve is inclined relative to the longitudinal central axis of the columnar shape at a different angle than is the inclined end surface of said ring tool.

3. The ring tool unit according to claim 1, wherein said sleeve is formed into a columnar shape, and the ring tool unit is formed by fitting said ring tool in said sleeve such that a compressive force is applied in a circumferential direction of said ring tool.

4. The ring tool unit according to claim 1, wherein said sleeve has a polygonal outer peripheral shape.

5. A method for manufacturing the ring tool unit cited in claim 1, wherein the ring tool is fixed to the sleeve by performing one of shrink-fit, cold-fit, and press-fit on the sleeve.

* * * * *